United States Patent [19]
Harding

[11] Patent Number: 5,256,006
[45] Date of Patent: Oct. 26, 1993

[54] DRIVING CAP FOR STAKES AND POSTS

[76] Inventor: Daniel M. Harding, 5581 Honey View Ter., Paradise, Calif. 95969

[21] Appl. No.: 764,430

[22] Filed: Sep. 23, 1991

[51] Int. Cl.$^5$ .............................. E02D 5/22; G01C 9/28
[52] U.S. Cl. ...................................... 405/255; 405/231; 405/232; 173/130
[58] Field of Search .............. 405/231, 232, 249, 253, 405/255; 173/128, 130

[56] References Cited

U.S. PATENT DOCUMENTS

| 59,990 | 11/1866 | Foley | 173/130 |
|---|---|---|---|
| 733,335 | 7/1903 | Shuman | 405/23 X |
| 735,205 | 8/1903 | Bunger . | |
| 1,444,834 | 2/1923 | Hindmarsh | 173/130 |
| 1,798,753 | 3/1931 | Paque . | |
| 2,198,985 | 4/1940 | Bailey | 405/253 |
| 2,214,295 | 9/1940 | De Biasi . | |
| 2,360,432 | 10/1944 | MacKenzie . | |
| 2,664,977 | 1/1954 | Starcevich | 405/255 X |
| 3,211,241 | 10/1965 | Kikuchi | 405/255 X |
| 3,319,328 | 5/1967 | Finger et al. . | |
| 4,565,251 | 1/1986 | Cischke | 173/128 |
| 4,663,856 | 5/1987 | Hall et al. | 33/373 |

FOREIGN PATENT DOCUMENTS

| 56518 | 6/1944 | Netherlands | 173/128 |
|---|---|---|---|
| 313782 | 8/1969 | Switzerland | 405/232 |

Primary Examiner—Dennis L. Taylor
Assistant Examiner—John Ricci
Attorney, Agent, or Firm—Craine & Jackson

[57] ABSTRACT

A driving cap for forcibly driving a wooden stake or fence post into the ground. The driving cap includes a horizontal hitting surface capable of withstanding the forces exerted manually by a hitting tool, such as a hammer, and an integrally attached sleeve member. The sleeve member has at least three vertical sides which extend downward and substantially perpendicular to the hitting surface. A central passageway is created in the sleeve member which is capable of receiving the top portion of a wooden stake or fence post. During use, the driving cap is placed over the end of the stake and fence post. A bubble level is attached to one vertical side of the sleeve member which enables the user to initially position and to maintain the stake's or post's longitudinal axis in a desired position while driving the stake or post into the ground. An information panel is also be attached to one side of the sleeve member which, in one embodiment, provides useful to provide information regarding the proper placement of the stake or post in the ground. In another embodiment, the information panel provides a writing surface for the user. An optional clip and distance gauge are also attached to the driving cap to aid the user.

6 Claims, 4 Drawing Sheets

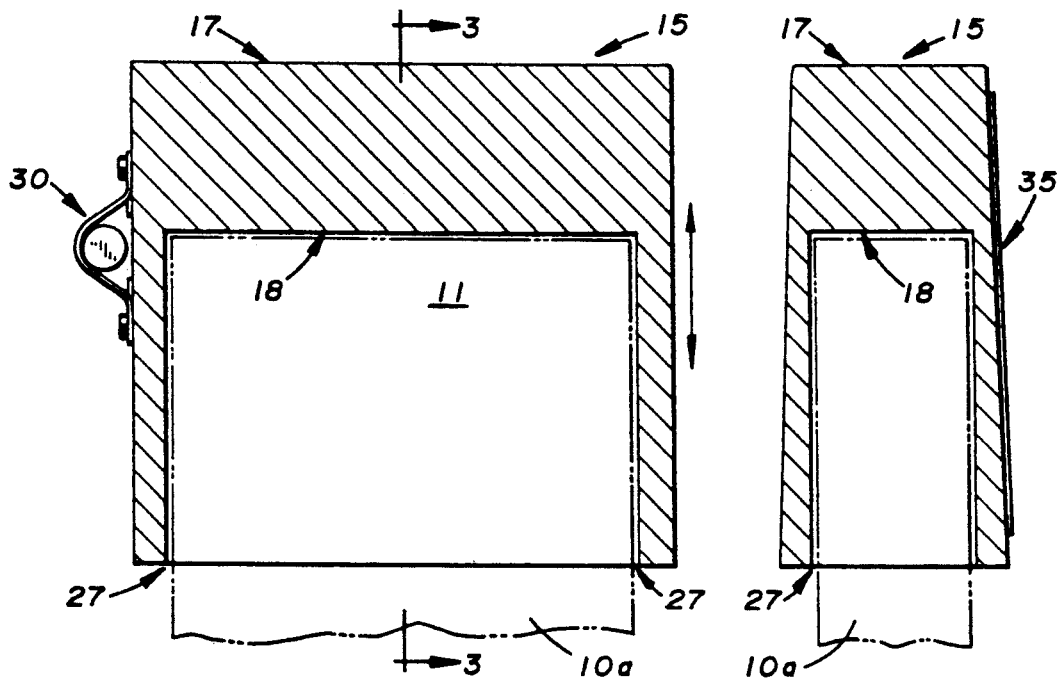
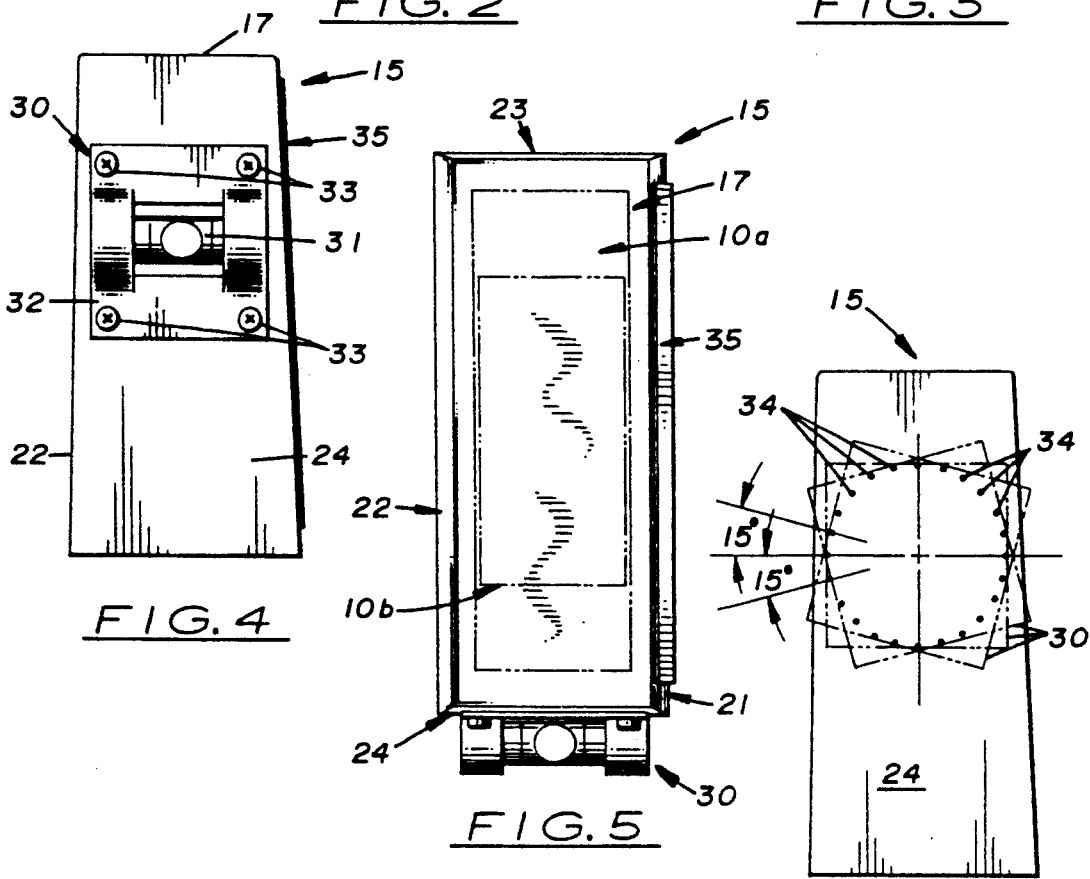

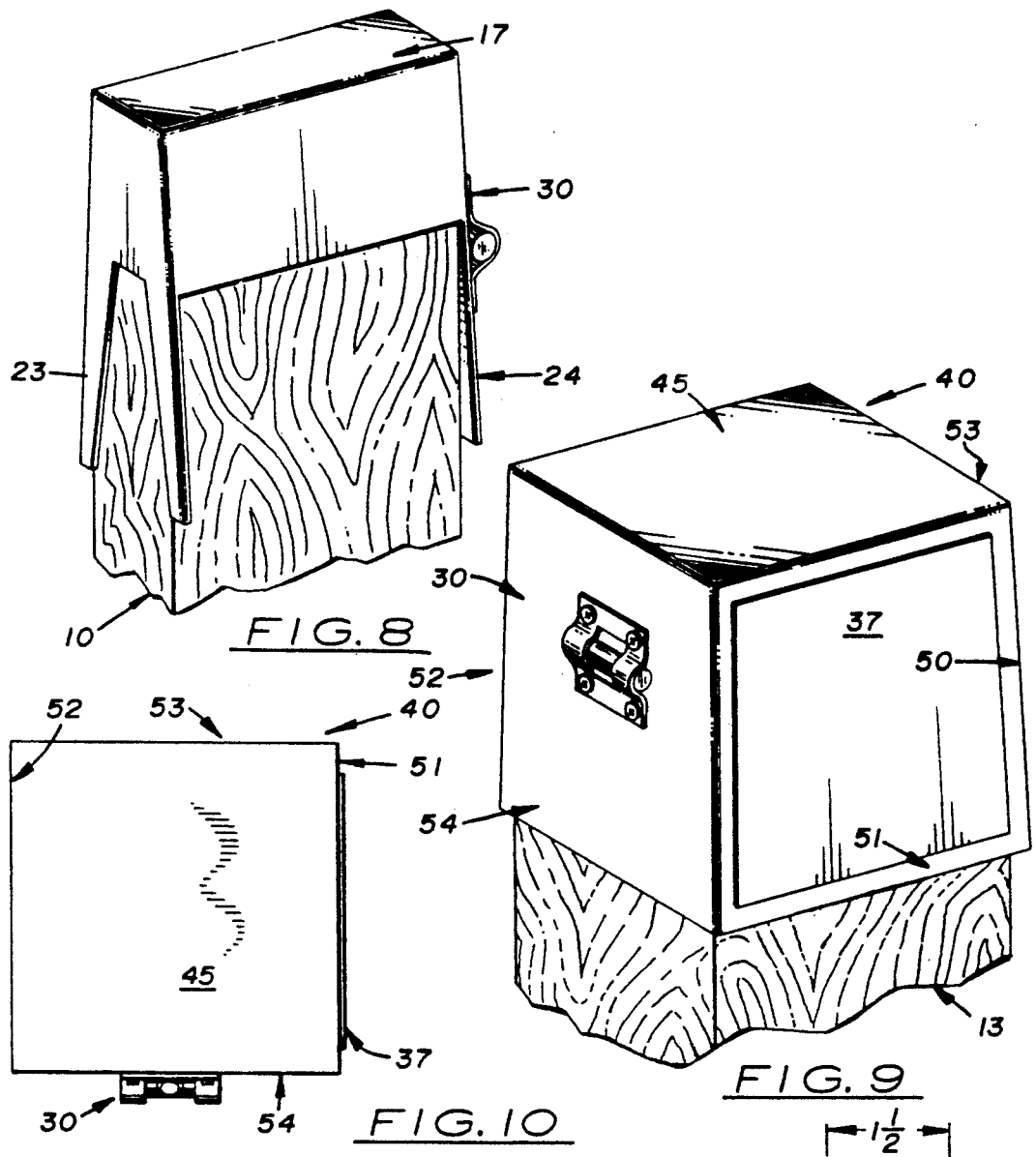

5,256,006

DRIVING CAP FOR STAKES AND POSTS

TECHNICAL FIELD

This invention relates to cap-like devices which may be placed over the end of a stake or post.

BACKGROUND ART

Wooden stakes are commonly used in the construction industry to indicate points or elevations in the land and to hold forms used to construct concrete objects, such as foundations, slabs or walkways. Because they are so widely used, a large number of stakes must be supplied to the workers. Although various sizes of stakes may be used, the more commonly used stakes measure one to two thick, one to two inches wide, and twelve to twenty-four inches long. In addition, they are typically made of relatively soft wood, such as fir or pine.

In order to provide adequate support, the stakes must be driven deeply into the ground. In some locations, the ground may be relatively hard thereby requiring the worker to hit the top surface of the stake with considerable force. Typically, the worker uses a claw hammer to apply the force which often destroys or severely mutilates the top surface of the stake, thereby preventing it from being used again. As a result, a large number of stakes are destroyed during construction at, of course, a great expense and inconvenience.

In the fence or wall building industry, ornamental posts are often used. Typically, such posts are placed in concrete which hardens around the lower portion of the post. During construction, it is sometimes necessary to lightly tap on the top surface of the post which can leave unsightly markings or blemishes. A protective driving cap which can be easily and conveniently used to drive such posts into the ground would be highly desirable.

When constructing certain structures, it is also sometimes necessary to drive the stakes into the ground at pre-determined locations and at different angles. For example, when constructing concrete forms, multiple stakes are often placed along the outside surface of the form. In order to provide adequate support, these stakes must be spaced at suitable distances apart. The amount of spacing required between stakes depends on such factors as: the size of the lumber used to construct the form, and; the height of the form above the ground. For the construction worker who must perform a multitude of tasks, such information can be easily forgotten.

When using longer stakes or posts in the fence building industry, it may also be important that the stake's or post's longitudinal axis be maintained in a vertical position while being driven into the ground. For a worker working alone or without assistance on sloped terrain, such a task can be difficult. A driving cap that helps the worker to determine and maintain the stake's or post's longitudinal axis while driving it into the ground, would be highly desirable.

None, of the driving cap structures known heretofore, neither address nor attempt to solve the above mentioned problems.

DISCLOSURE OF INVENTION

It is a general object of the present invention to provide a relatively small, lightweight driving cap which can be placed over the end of a stake or post to protective it while being driven into the ground.

It is another object of the present invention to provide such a driving cap which may be used with various sizes of stakes or posts commonly used in the construction or fence building industry.

It is another object of the present invention to provide such a driving cap which has means for providing helpful information to the user during use.

It is a further object of the present invention to provide such a driving cap which will help the user determine and maintain the stake's or post's longitudinal axis during use.

These and other objects of the invention are met by providing a driving cap designed to be used with various sizes of stakes and posts used today in the construction or fence building industry. The driving cap is designed to be placed over the top portion of a stake or post to protect the top surface from damage while being forcibly driven into the ground. The driving cap comprises a horizontal hitting surface and an integrally attached sleeve member. The hitting surface is a durable, flat surface capable of withstanding the forces exerted thereon by a user when driving the stake or post into the ground. The sleeve member has at least three planar vertical surfaces which extend downward substantially perpendicularly to the hitting surface. Inside the sleeve member is a square or rectangular passageway through which the top portion of the stake or post may be extended into during use. The upper, inside surface of the passageway is substantially parallel to the hitting surface. When the driving cap is placed over the top portion of the stake or post, the upper, inside surface of the passageway rests against the top surface of the stake or post. During use, the user hits the hitting surface with a hammer or some other suitable tool which forcibly drives the stake or post into the ground. The length of the passageway is sufficient so that the driving cap remains in place over the top portion of the stake or post during use.

An alignment means is attached to the driving cap which enables the user to determine and to maintain the stake or post at a desired angle relative to the ground while being hit. In the preferred embodiment, the alignment means comprises a bubble level securely or adjustably attached to a surface of the sleeve member.

An information panel is also attached to a vertical surface of the sleeve member to provide useful information or a writing surface for the user during use.

The driving cap is designed to be small and lightweight capable of being easily carried in the user's belt, pouch or tool box. An optional attachment means is provided which enables the driving cap to be easily attached to the user's belt or pouch.

In another embodiment of the invention, an optional distance gauge may be pivotally attached to one surface of the driving cap designed to help the user maintain the stake a desired distance from a reference line.

BRIEF DESCRIPTION OF DRAWINGS

FIG. 2 is a sectional, side elevational view of the embodiment shown in FIG. 1.

FIG. 3 is a sectional, end elevational view of the embodiment taken along lines 3—3 taken in FIG. 2.

FIG. 4 is an end elevational view of the embodiment shown in FIGS. 1-3 showing a bubble balance attached to a vertical surface.

FIG. 5 is an illustration showing the embodiment shown in FIGS. 1-4 being used with alternative stakes sizes.

FIG. 6 is a side elevational view of the embodiment shown in FIG. 1-5 showing a plurality of holes manufactured thereon which enables the user to adjust the longitudinal axis of the bubble level.

FIG. 8 is a perspective view of another embodiment of the present invention having three vertical surfaces and a side vertical surface partially removed.

FIG. 9 is another embodiment of the present invention shown being used with square, cross-sectional posts.

FIG. 10 is a top plan view of the embodiment shown in FIG. 8.

FIGS. 11(a) and (b) are partial, perspective views of the various types of attachment means with may be attached to the driving cap.

FIG. 12 is an illustration showing an optional distance gauge attached to one surface of the driving cap.

BEST MODE FOR CARRYING OUT THE INVENTION

Figure 1:
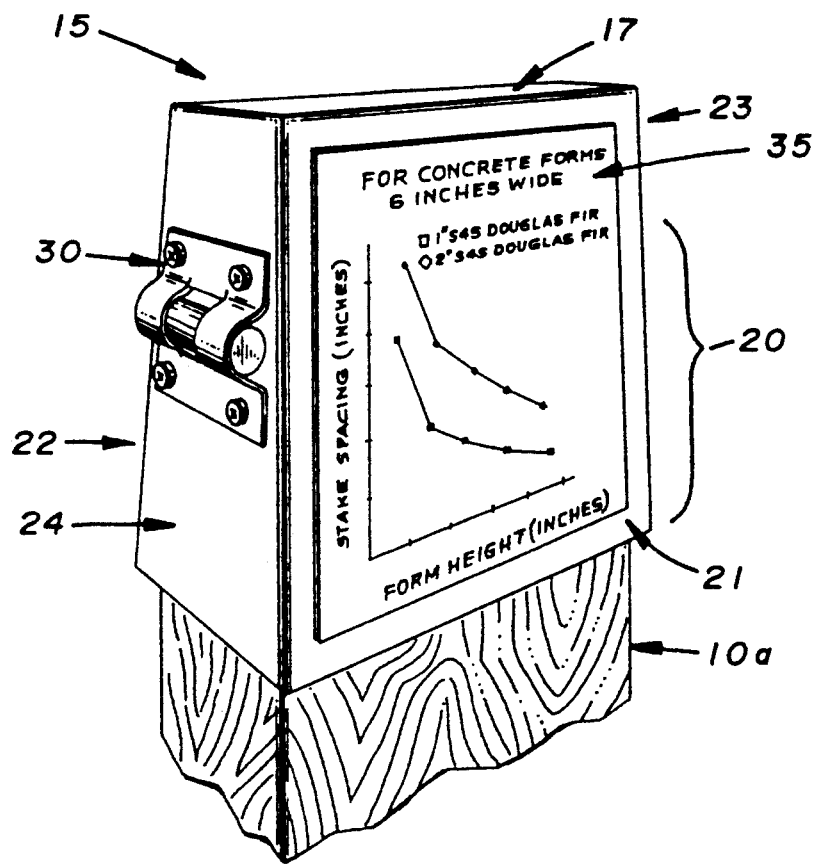
FIG. 1 is a perspective view of one embodiment of the invention described herein.

Referring to FIG. 1, there is shown a protective driving cap 15 incorporating the present invention. The driving cap 15 is designed to be placed over the top portion of a wooden stake 10 or a post.

The driving cap 15 comprises a relatively flat, horizontal hitting surface 17 and an integrally attached sleeve member 20. In the preferred embodiment, the sleeve member 20, which is manufactured substantially perpendicular to the hitting surface 17, comprises four vertical, planar surfaces—a front surface 21, a back surface 22, a first side surface 23, and a second side surface 24. Inside the sleeve member 20 is a passageway 27 manufactured centrally substantially parallel to the sleeve member's longitudinal axis. Passageway 27 is open at one end and terminates at the inside surface 18 of hitting surface 17. As shown in FIG. 2, driving cap 15 is designed to receive by sliding action the top portion of a (1×3) inch stake 10 having a nominal measurement of 1 inch×3 inches. Since the actual dimensions of wooden stakes are generally ¼ to ½ inches less than the nominal dimensions, passageway 27 is rectangular in cross-section measuring approximately one inch wide and three inches thick. As shown in FIG. 5, by manufacturing passageway 27 with these dimensions, driving cap 15 may used with (1×3) and (1×2) inch stakes, indicated as 10(a) and 10(b), respectively. As discussed further below, other embodiments of the driving cap 15 are provided for use with stakes or posts having other dimensions or having round or square cross-sectional shapes.

As shown in FIGS. 2 and 3, during use the driving cap 15 is placed over the top portion 14 of stake 10. The sleeve member 20 and the length of passageway 27 is sufficient so that driving cap 15 maintains the its position on stake 10 when hit with a hitting tool. In the preferred embodiment, length of passageway 27 is approximately 2 inches.

As shown in FIGS. 1, 2, and 4, a bubble level 30 is attached to one surface (side surface 24 shown) of the sleeve member 20 which enables the user to initially select and to maintain the stake 10 in a desired vertical position when driven into the ground. The bubble level 30 includes a typical bulb element 31 secured to the side surface 24 by a bracket 32 which is attached thereto by threaded connectors 33. In the preferred embodiment, the bracket 32 is attached to the side surface 24 so that bubble level 30 indicates a substantially horizontal position when the driving cap 15 is placed on a stake 10 and held in the vertical position. By monitoring the bubble element 31, the user is able to adjust the position of the stake's longitudinal axis 28 so that the stake 10 is driving into the ground at the desired angle.

As shown in FIG. 6, bubble level 30 may be adjustably attached to the side surface 24 which enables the user to selectively change its relative position on the driving cap 15. This allows the user to adjust the driving cap 15 to drive stakes 10 at different selected angles into the ground. In the embodiment shown, a plurality of sets of four holes 34 (six sets shown) are manufactured on side surface 24. The holes 34 are properly aligned and spaced so that the relative position of the bubble level 30 may be rotatably adjusted 15 degrees on side surface 24.

Figure 7:
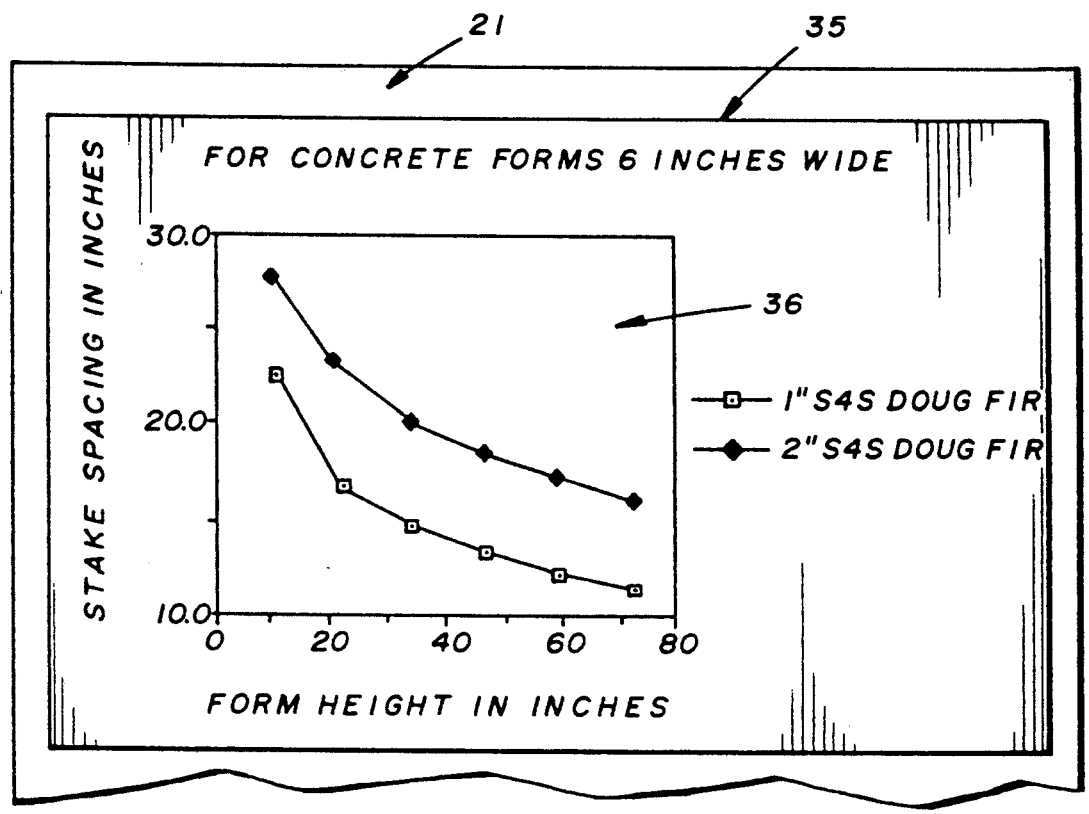
FIG. 7 is a illustration of the information panel attached to one surface of the sleeve member.

As shown in FIGS. 1 and 3, an information panel 35 is attached to the front surface 21 of sleeve member 20 which provides useful information to the user. As shown more clearly in FIG. 7, in the preferred embodiment, the information panel 35 is made of thin, transparent polyester film material which is adhesively attached to the front surface 21. A graph 36 is printed on one surface (surface 21 shown) of the information panel 35 which enables the user to select the proper spacing between stakes measuring one inch thick for constructing a concrete form a desired height above the ground using (1×6) or (2×6) lumber. In graph 36, the spacing (shown in inches) between stakes is indicated along the y-axis while the height (shown in inches) of the top edge of the form above the ground is indicated along the x-axis. By selecting and following the correct line which corresponds to the desired size lumber used to construct the form, the user can determine the proper spacing between stakes for constructing the form having a desired height. It should be appreciated that the graph may be modified for other types of stakes, lumber, and used to provide other types of useful information.

As shown in FIG. 8, one or more side surfaces of the driving cap 15 may be modified or eliminated to reduce the cap's overall weight. For example, in the embodiment shown, side surface 23 is partially removed while back surface 21 is eliminated altogether.

As shown in FIGS. 9 and 10, a second embodiment of the invention is shown comprising a driving cap 40 designed to be used with square cross-sectional stakes or posts 13. Driving cap 40 comprises a substantially flat, horizontal square hitting surface 45, a downward extending sleeve member 50, and a substantially square, cross-sectional central passageway (not shown). A bubble level 30 and an information panel 35 are attached to the sleeve member 50 as provided with driving cap 15. In the preferred embodiment, driving cap 40 is manufactured to be used with stakes or posts measuring (4×4) inches. When used to construct fence posts, the information panel 35 comprises an erasable writing surface upon which the user can write useful information. In the preferred embodiment, the information panel 35 comprises a laminated plastic sheet which is adhesively attached to the front side surface 51 of sleeve member 50.

As shown in FIGS. 11(a) and (b), an optional attachment means may be attached to a side, front or back surface of the sleeve member 20 or 50 so that driving caps 15 and 40, respectively may be removably attached to the user's belt or pouch. FIG. 11(a) shows the attachment means comprising a hole 72 manufactured through a vertical surface on the sleeve member 20. Hole 72 connects to a hook or other type of connector (not shown) attached to the user's belt or pouch. FIG. 11(b) shows the attachment means comprising a clip 74 which may be slidingly engaged with a ring, an eyelet structure, or a loop structure (not shown) located on the user's belt or pouch.

As shown in FIG. 12, an optional distance gauge 80 may be pivotally attached a side surface 23 or 24 (side surface 24 shown) of the sleeve member 20 and used by the user to drive stakes a desired distance from a reference point, such as a line 99. Distance gauge 80 may be pivotally attached to side surface 24 using any suitable pivoting connector 82. During use, the end of distance gauge 80 is held up to the line 99 while the device 20 is used to drive the stake into the ground. In the preferred embodiment, distance gauge 80 is manufactured a sufficient length so that the edge of the stake when driven into the ground is approximately 1½ inches from the line 99.

Driving caps 15 and 40 may be manufactured out of any lightweight material sufficiently strong enough to withstand the impact forces exerted on the hitting surface 17 or 45 during use. In the preferred embodiment, driving caps 15 and 40 are made of aluminum or aluminum alloy materials. In order to withstand the impact forces exerted by a hammer to drive stakes, the hitting surface 17 or 47 is manufactured approximately one inch thick. When manufactured with aluminum or an aluminum alloy, device 15 weighs approximately one pound. When driving cap 15 or 40 is designed for use with less impact force, such as during fence construction where light hitting or tapping is used to set the fence post in the ground or in concrete, the thickness of hitting surface 17 or 47 may be considerably less and made of less durable material, such as synthetic polymeric material.

In compliance with the statute, the invention has been described in language more or less specific as to the elements or steps required to practice the invention. It is understood, however, that the invention is not limited to the elements or steps described herein, since they describe the preferred manner of putting the invention into practice. The invention is therefore, claimed in any of its forms or modifications within the legitimate and valid scope of the appended claims properly interpreted in accordance with the doctrine of equivalents.

INDUSTRIAL APPLICABILITY

The invention disclosed herein will have wide applicability in industries where stakes or posts are forcibly driven into the ground with impact force against the top surface of a stake or post. More particularly, the invention will be widely used in the construction, landscaping, and fence building industries.

I claim:
1. A driving cap for a stake or post, comprising;
   a. a hitting surface sufficiently strong to withstand the forces exerted by a user to drive said stake or said post in the ground;
   b. a sleeve member integrally attached to said hitting surface, said sleeve member having at least three vertical surfaces which extend downward substantially perpendicular from said hitting surface, said sleeve member having a central passageway capable of receiving the top portion of said stake or said post;
   c. a bubble level adjustably attached to one said vertical surface on said sleeve member, said bubble level enabling a user to initially set and maintain said stake or said post in a desired vertical position when said driving cap is placed over said top portion of said stake or post and forcibly driven in the ground, said bubble level being adjustably attached to said vertical surface which enables said user to selectively change the position of said bubble level on said vertical surface so that said stake or post may be initially set and driven in the ground at selected angles;
   d. an information panel attached to one said vertical surface of said sleeve member, and;
   e. an attachment means attached to one said vertical surface of said sleeve member enabling said driving cap to be attached to a user's belt or pouch.

2. A driving cap for a stake or post, comprising:
   a. a hitting surface sufficiently strong to withstand the forces exerted by a user to drive said stake or said post in the ground;
   b. a sleeve member integrally attached to said hitting surface, said sleeve member having at least three vertical surfaces which extend downward substantially perpendicular from said hitting surface, said sleeve member having a central passageway capable of receiving the top portion of said stake or said post;
   c. a bubble level adjustably attached to one said vertical surface on said sleeve member, said bubble level enabling a user to initially set and maintain said stake or said post in a desired vertical position when said driving cap is placed over said top portion of said stake or post and forcibly driven in the ground, said bubble level being adjustably attached to said vertical surface which enables said user to selectively change the position of said bubble level on said vertical surface so that said stake or post may be initially set and driven in the ground at selected angles;
   d. an information panel attached to one said vertical surface of said sleeve member, and;
   e. a distance gauge pivotally attached to one said vertical surface of said sleeve member, said distance gauge being a sufficient length so that when pivoted to a horizontal position, said user may initially set and maintain said stake or said post a desired distance from a reference line while said stake or said post is being forcible driven in the ground.

3. A driving cap, comprising:
   a. a substantially flat, horizontal hitting surface;
   b. a sleeve member integrally attached to said hitting surface, said sleeve member having at least three vertical side surfaces which extend downward substantially perpendicular from hitting surface, said sleeve member having a central passageway with a longitudinal axis, said central passageway being capable of receiving the end of a (1×3) inch stake or post;

c. a bubble level attached to one said vertical side surface of said sleeve member, said bubble level being capable of indicating the vertical position of said longitudinal axis of said central passageway when said driving cap is placed over said end of said stake or said post;

d. an information panel attached on one said vertical side surface, said information panel having stake spacing and form height information printed thereon, and;

e. attachment means manufactured on one said vertical side surface of said sleeve member enabling said driving cap to be easily attached to a user's belt or pouch.

4. A driving cap, as recited in claim 3, further comprising a distance gauge pivotally attached to one said vertical side surface of said sleeve member enabling a user to set and maintain said stake or said post a desired distance from a reference line while being forcible driven in the ground.

5. A driving cap, comprising:

a. a substantially flat, horizontal hitting surface;

b. a sleeve member integrally attached to said hitting surface, said sleeve member having a front vertical surface, a back vertical surface, a first side vertical surface, and a second side vertical surface, said sleeve member having a central passageway formed therein capable of receiving the top portion of a stake or fence post;

c. a bubble level attached to said second side vertical surface of said sleeve member;

d. an information panel attached to said front vertical side surface, said information panel having stake spacing and form height information printed thereon, and;

e. a distance gauge pivotally attached to said first vertical side surface.

6. A driving cap, as recited in claim 5, further comprising a hole manufactured on one said vertical surface of said sleeve member enabling said driving cap to be connected to a suitable connector so that said driving cap may be attached to a user's belt or pouch.

* * * * *